United States Patent
Dietewich et al.

(10) Patent No.: US 9,604,678 B2
(45) Date of Patent: Mar. 28, 2017

(54) AERODYNAMICALLY EFFECTIVE DEVICE FOR A MOTOR VEHICLE

(75) Inventors: Horst Dietewich, Reichertshausen (DE); Patrick Moll, Munich (DE); Karl-Josef Huber, Neufahrn (DE); Georg Strobl, Otterfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 759 days.

(21) Appl. No.: 13/441,392

(22) Filed: Apr. 6, 2012

(65) Prior Publication Data
US 2012/0259517 A1    Oct. 11, 2012

(30) Foreign Application Priority Data
Apr. 7, 2011  (DE) .................. 10 2011 006 908

(51) Int. Cl.
  *B60R 22/00*   (2006.01)
  *B62D 35/00*   (2006.01)
  *B62D 37/02*   (2006.01)

(52) U.S. Cl.
  CPC ............ *B62D 35/00* (2013.01); *B62D 37/02* (2013.01)

(58) Field of Classification Search
  USPC ............... 701/49, 117; 296/180.1, 180.5; 310/12.01; 324/207.11–207.26
  See application file for complete search history.

(56) References Cited

U.S. PATENT DOCUMENTS

| | | |
|---|---|---|
| 2004/0075298 A1 | 4/2004 | Wong et al. |
| 2008/0154465 A1* | 6/2008 | Djordjevic ...................... 701/49 |
| 2011/0148143 A1* | 6/2011 | Ondracek ................. 296/180.5 |

FOREIGN PATENT DOCUMENTS

| | | |
|---|---|---|
| DE | 10 2006 058 722 B4 | 8/2010 |
| JP | 8-258754 A | 10/1996 |

OTHER PUBLICATIONS

German Search Report dated Feb. 8, 2012 with partial English translation (ten (10) pages).

* cited by examiner

*Primary Examiner* — Thomas G Black
*Assistant Examiner* — Luke Huynh
(74) *Attorney, Agent, or Firm* — Crowell & Moring LLP

(57) ABSTRACT

An aerodynamically effective device for a motor vehicle has an air guide element that can be moved between a position of rest and at least one operating position, a drive unit for moving the air guide element, and a control unit. The control unit is adapted to instruct the drive unit to move the air guide element from the position of rest into the operating position, on reaching a first vehicle speed threshold value. Furthermore, the control unit is adapted to carry out a function test of the drive unit below the first vehicle speed threshold value.

20 Claims, 1 Drawing Sheet

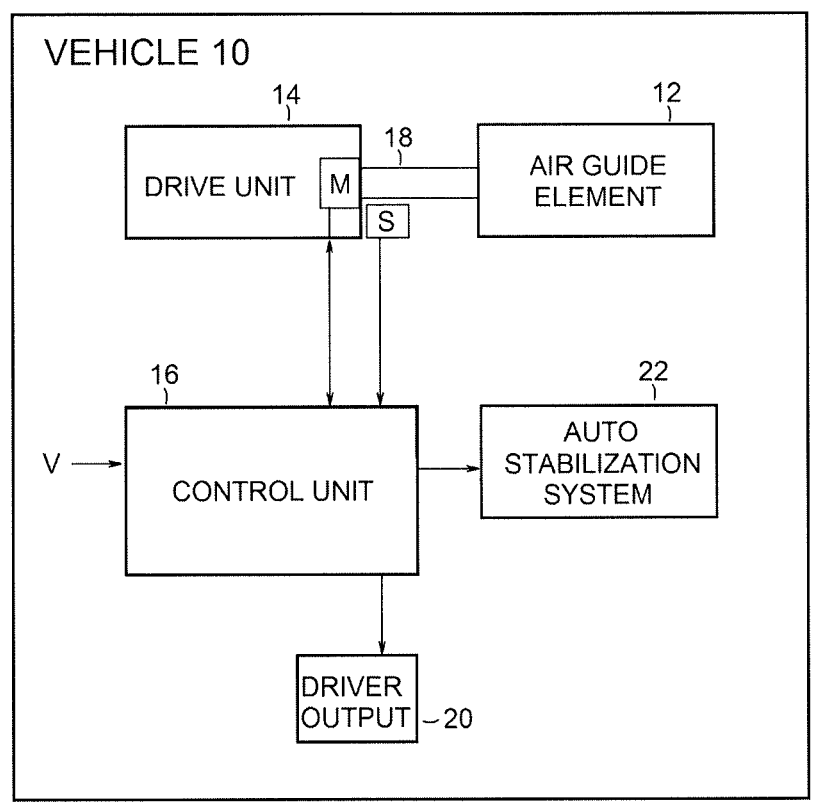

AERODYNAMICALLY EFFECTIVE DEVICE FOR A MOTOR VEHICLE

CROSS-REFERENCE TO RELATED APPLICATIONS

This application claims priority under 35 U.S.C. §119 from German Patent Application No. DE 10 2011 006 908.9, filed Apr. 7, 2011, the entire disclosure of which is herein expressly incorporated by reference.

BACKGROUND AND SUMMARY OF THE INVENTION

The present invention relates to an aerodynamically effective device for a motor vehicle and a motor vehicle with such an aerodynamically effective device.

To date there exists a device for sensing the position of a spoiler on a motor vehicle. In particular, the spoiler can be moved with a drive unit between a retracted setpoint base position and at least one extended setpoint operating position. In this case the device has at least one sensor that can sense at least one of the setpoint positions of the spoiler and that generates first position signals on the basis of the sensed setpoint position. At the same time an adjustment position sensing device determines a malfunction of the spoiler or, more specifically, at least one malfunction of a sensor, that is, whether the spoiler has actually been extended or whether the functional capability of the sensor is ensured. Such a device is known from DE 102006058722 B4.

At this point an object of the present invention is to provide an aerodynamically effective device for a motor vehicle with an air guide element, which can be moved between a position of rest and at least one operating position, and a motor vehicle with such an aerodynamically effective device, which enables early detection of a malfunction of the aerodynamically effective device and, thus, enhances the operational safety of a motor vehicle.

This and other objects are achieved with an aerodynamically effective device that is intended for a motor vehicle. According to the present invention, an aerodynamically effective device for a motor vehicle has an air guide element, which can be moved between a position of rest and at least one operating position, a drive unit for moving the air guide element, and a control unit, which is adapted to instruct the drive unit to move the air guide element from the position of rest into the operating position, on reaching a first vehicle speed threshold value. Furthermore, the control unit is adapted to carry out a function test of the drive unit below the first vehicle speed threshold value, that is, before reaching the first vehicle speed threshold value.

Hence, according to the present invention, the control unit carries out the function test, before the aerodynamically effective device, in particular the air guide element, is moved into its operating position, in order to influence, or more specifically change, the aerodynamics of the motor vehicle. Usually an aerodynamically effective device for a motor vehicle is not put into operation until after a specified vehicle speed, that is the first vehicle speed threshold value, in order to change the aerodynamics of the vehicle and, thus, to improve the vehicle handling, or more specifically the road holding quality, of the vehicle, for example, by increasing the power output of the motor vehicle, after the first vehicle speed threshold value.

It has been found beneficial to check the function of the air guide element, or more specifically the associated drive unit, before the first vehicle speed threshold value is reached, in order to take, if necessary, counter-measures and, thus, to enhance the operational safety of the motor vehicle.

According to a further development of the present invention, the air guide element can be moved into a function test position for the function test. The function test position is different from the position of rest and the at least one operating position and lends itself well to checking the basic function of the air guide element or more specifically the drive unit.

Furthermore, the control unit can be adapted to determine by way of a position sensing device when the function test position has been reached. The position sensing device can be, for example, a Hall sensor or a micro switch. Furthermore, the position sensing device can be located in the region of the drive unit, that is, an actuating unit, like an engine or an adjustment mechanism, or can sense directly by itself the position of the air guide element.

Thus, in the event that the setpoint function position deviates from the actual function position, that is, a state, in which the function test position has not been reached, the aforementioned feature makes it easy to determine a malfunction of the aerodynamically effective device.

Preferably, the function test position lies between the position of rest and the operating position of the air guide element. In particular, the function test position lies in close proximity to the position of rest.

The state of reaching the function test position can also be sensed by just the departure from the position of rest of the air guide element.

As a result, a shorter travel distance is necessary (or rather possible) for the function test than for the actual operating position of the air guide element. Consequently, the function test can be carried out quickly, and the function test can be carried out in such a way that it is hardly visible from the outside. In addition, a function test position in close proximity to the position of rest is practically ineffective with respect to a change in the aerodynamics of the motor vehicle.

According to the present invention, the control unit can carry out the function test at every engine start up. In this context an engine may be any drive unit, such as an internal combustion engine or an electric motor. In the case of an internal combustion engine, every engine start up can include, for example, every engine start up in the case of an active start and stop function.

The aforementioned control unit carries out the function test early, that is, typically prior to starting up the motor vehicle, so that counter-measures can be taken in advance manually by the driver or automatically by the motor vehicle.

Furthermore, the control unit can carry out the function test at every restart of the vehicle. In this case a vehicle restart is the process of putting the vehicle into operation after the vehicle has been immobilized for a defined period of time, after the vehicle has been switched on with a key or a start button and the like.

Furthermore, the control unit of the present invention can carry out the function test on reaching a second vehicle speed threshold value that is less than the first vehicle speed threshold value. This feature ensures that the function test is carried out prior to reaching the first vehicle speed threshold value, at which the aerodynamics of the motor vehicle are supposed to change.

According to an additional further development, the control unit can automatically activate a system for automatic stabilization of the vehicle in the event that a malfunction is detected during the function test. In particular, the control unit can activate the automatic stabilization on reaching a third vehicle speed threshold value. The third vehicle speed threshold value can be identical to the first vehicle speed threshold value. The term automatically means that the system for automatic stabilization of the motor vehicle is activated, even if it has been manually switched off by a driver of the motor vehicle, that is, was deactivated. A system for automatic stabilization of the motor vehicle can be, for example, a driver assistance system that intervenes in the drive and brake system. One example of such a system is an electronic stability system or more specifically a dynamic stability control.

In this way the motor vehicle can be automatically stabilized by the system for automatic stabilization of the motor vehicle at high speeds despite the malfunction of the aerodynamically effective device.

Furthermore, in the event that a malfunction is detected during the function test, the control unit can inform the driver of the motor vehicle in a visual or acoustic manner about the malfunction. Given this information, the driver can take counter-measures and is prepared for a poorer response of the motor vehicle at a high speed.

Furthermore, in the event that a malfunction is detected during the function test, the control unit can switch off a drive motor of the drive unit. This feature prevents the drive motor from overheating, for example in the event that the air guide element is blocked. A typical blockage of the air guide element can be induced when the aerodynamically effective device is covered with ice. This measure prevents a defect of the drive motor.

The above-described air guide element of the present invention can be mounted on the rear of the motor vehicle and is designed, for example, as a rear spoiler or a rear wing. The rear spoiler or rear wing is activated, for example, after the first vehicle speed threshold value, and is extended into an operating position.

Of course, the air guide element can have a variety of operating positions depending on the motor vehicle speed. In this respect the air guide element remains in its position of rest until the first vehicle speed threshold value.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a schematic block diagram illustrating an exemplary embodiment of an aerodynamically effective device for a motor vehicle in accordance with the present invention.

DETAILED DESCRIPTION OF THE DRAWINGS

Referring to FIG. 1, an exemplary embodiment of the present invention is shown by way of a schematic block diagram of a motor vehicle 10, equipped with an air guide element 12, such as an extendable spoiler mounted on a rear of motor vehicle 10, a drive unit 14 having a drive motor M for drivably moving the air guide element 12, a control unit 16 operatively configured to control the guide unit 14 and receiving inputs, such as the vehicle speed and an air guide element sensor input S. The control unit 16 is further operatively configured to output information to a driver of the vehicle and to control an automatic stabilization system 22, such as an electronic stability system or a dynamic stability control system.

In exemplary embodiment, an extendable spoiler serves as the aerodynamically effective device 12. The spoiler is mounted on the rear of a motor vehicle 10 and can be moved between a position of rest and at least one operating position. For this purpose, a drive unit 14 is provided with a drive motor M.

When the spoiler 12 is in its position of rest, the spoiler is configured flush with the surrounding vehicle body elements on the rear of the motor vehicle. For a function test, the spoiler 12 is moved into a function test position. The spoiler is moved into the function position over a distance of only a few millimeters. As a result, on the one hand, the function test is hardly visible from the outside, and, on the other hand, it is highly improbable that an object will be caught in the spoiler during the function test, especially if the function test is carried out when the motor vehicle is immobilized. Moreover, the short distance into the function test position enables a fast function test.

The state of reaching or not reaching the function test position of this exemplary embodiment is monitored with a Hall sensor S. It is also possible that the Hall sensor S merely monitors the departure of the air guide element 12, such as the spoiler, from the position of rest, so that a control unit 16 of the extendable spoiler detects when the spoiler has reached the function test position, as soon as the spoiler is moved out of the position of rest. The Hall sensor S of the present exemplary embodiment senses a rotation of a drive axis 18 of a servomotor M of a drive unit 14 for the spoiler.

The function test is carried out at every vehicle restart. A vehicle restart in the context of this exemplary embodiment does not mean an engine start and stop function of an internal combustion engine when the vehicle stops for a short period of time, but rather a re-activation of the motor vehicle after a prolonged period of immobilization through activation of an ignition, insertion of a key, or other processes that alone make it possible to start the vehicle.

In a modified arrangement of this exemplary embodiment, the function test does not commence until after the speed exceeds 5 km/h, which corresponds to a second speed threshold value according to the present invention.

If the function test is negative, that is if a malfunction of the spoiler is determined because it has not reached the function test position, then, on the one hand, the drive motor M of the drive unit 14 is switched off in order to protect the drive motor from overheating. Furthermore, the driver is informed by an output 20, such as a pointer on an instrument display, that a malfunction of the spoiler has occurred and that the spoiler cannot be put into operation for the intended purpose.

In a modified arrangement of the exemplary embodiment, an optional manual deactivation of a dynamic stability system 22 is automatically cancelled on reaching a specified speed that corresponds to the third speed threshold value according to the present invention, and the dynamic stability system is activated, in order to increase the operational safety of the motor vehicle after the third speed threshold value.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An aerodynamic device for a motor vehicle, comprising:
   an air guide element movable between a position of rest and at least one operating position;
   a drive unit operatively coupled to the air guide element for moving the air guide element; and
   a control unit operatively configured to control the drive unit to move the air guide element from the position of rest into the operating position upon reaching a first vehicle speed threshold value, the control unit being further operatively configured to perform a function test of the drive unit below the first vehicle speed threshold value.

2. The aerodynamic device according to claim 1, wherein the air guide element is movable into a function test position for the function test.

3. The aerodynamic device according to claim 2, further comprising:
   a position sensing device operatively coupled to the control unit, the control unit being operatively configured to determine when the function test position is reached via input from the position sensing device.

4. The aerodynamic device according to claim 3, wherein the position sensing device is a Hall sensor.

5. The aerodynamic device according to claim 2, wherein the function test position is a position between the position of rest and the operating position of the air guide element.

6. The aerodynamic device according to claim 5, wherein the function test position is within a few millimeters of the position of rest.

7. The aerodynamic device according to claim 3, wherein the function test position is a position between the position of rest and the operating position of the air guide element.

8. The aerodynamic device according to claim 7, wherein the function test position is within a few millimeters of the position of rest.

9. The aerodynamic device according to claim 1, wherein the control unit is operatively configured to perform the function test at every engine startup.

10. The aerodynamic device according to claim 1, wherein the control unit is operatively configured to perform the function test at every vehicle restart.

11. The aerodynamic device according to claim 1, wherein the control unit is operatively configured to perform the function test upon reaching a second vehicle speed threshold value that is less than the first vehicle speed threshold value.

12. The aerodynamic device according to claim 1, further comprising:
   a system for automatic stabilization of the motor vehicle, said system being coupled with the control unit; and
   wherein in an event that a malfunction is detected during the function test, the control unit automatically activates the system for automatic stabilization.

13. The aerodynamic device according to claim 12, wherein the control unit automatically activates the system for automatic stabilization upon reaching a third vehicle speed threshold value.

14. The aerodynamic device according to claim 1, further comprising:
   a driver output device coupled with the control unit; and
   wherein in an event that a malfunction is detected during the function test, the control unit informs a driver of the malfunction via the driver output device.

15. The aerodynamic device according to claim 14, wherein the driver output is at least one of a visual and acoustic output by which the driver is informed of the malfunction.

16. The aerodynamic device according to claim 12, further comprising:
   a driver output device coupled with the control unit; and
   wherein in an event that a malfunction is detected during the function test, the control unit informs a driver of the malfunction via the driver output device.

17. The aerodynamic device according to claim 1, wherein the drive unit comprises a drive motor; and
   wherein in an event that a malfunction is detected during the function test, the control unit is operatively configured to switch-off the drive motor of the drive unit.

18. The aerodynamic device according to claim 16, wherein the drive unit comprises a drive motor; and
   wherein in an event that a malfunction is detected during the function test, the control unit is operatively configured to switch-off the drive motor of the drive unit.

19. The aerodynamic device according to claim 1, wherein the air guide element is mounted on a rear of the motor vehicle as one of a rear spoiler and a rear wing.

20. A motor vehicle, comprising:
   a motor vehicle body;
   an air guide element mounted on the motor vehicle body, the air guide element being movable between a position of rest and at least one operating position;
   a drive unit operatively coupled to the air guide element for moving the air guide element; and
   a control unit operatively configured to control the drive unit to move the air guide element from the position of rest into the operating position upon reaching a first vehicle speed threshold value, the control unit being further operatively configured to perform a function test of the drive unit below the first vehicle speed threshold value.

* * * * *